United States Patent

[11] 3,578,764

| [72] | Inventors | Robert L. Nunnally<br>Valley Forge;<br>Thomas L. Weil, Paoli, Pa. |
|------|-----------|---|
| [21] | Appl. No. | 844,083 |
| [22] | Filed | July 23, 1969 |
| [45] | Patented | May 18, 1971 |
| [73] | Assignee | Bentley-Harris Manufacturing Company<br>Conshohocken, Pa. |

[54] OVEN DOOR SEAL AND METHOD OF MAKING SAME
9 Claims, 8 Drawing Figs.

[52] U.S. Cl. .................................................... 87/6, 28/72,
29/193, 49/479, 277/230
[51] Int. Cl. ...................................................... D04c 1/06
[50] Field of Search ........................................... 87/6, 7, 9;
66/9 (A), 9, 190; 277/230; 28/76 (T), 72; 29/193;
49/479

[56] References Cited
UNITED STATES PATENTS

| 2,219,962 | 10/1940 | Reynolds et al. | 49/479 |
| 2,924,471 | 2/1960 | Poltorak et al. | 277/230X |
| 2,445,231 | 7/1948 | McDermott | 87/6UX |
| 2,882,082 | 4/1959 | Poltorak et al. | 277/230X |
| 3,131,592 | 5/1964 | Norehad | 87/6 |

FOREIGN PATENTS

| 690,906 | 4/1953 | Great Britain | 277/230 |

Primary Examiner—Mervin Stein
Attorney—Howson and Howson

ABSTRACT: A heat-resistant gasket is provided for sealing a space between a door and a jamb around an access opening in an oven of the self-cleaning type. The gasket has a braided fiberglass jacket which has a line of juncture extending longitudinally to dispose a resilient metal mesh tubular sealing element and a tubular mounting element in spaced parallel relation therein, the mounting element being engaged by clamping means on the door which secures it thereto to dispose the sealing element in the space to be sealed. In addition, there is disclosed a method for fabricating the gasket which includes the steps of braiding the fiberglass jacket around both a knitted wire mesh core in the tubular sealing element and a paper core in the tubular mounting element as the elements advance in spaced parallel relation and joining the braided jacket longitudinally between the elements by stitching, then shaping the sealing element, and heating the gasket assembly to an elevated temperature to disintegrate the paper core and to set its shape.

PATENTED MAY 18 1971
3,578,764
SHEET 1 OF 2
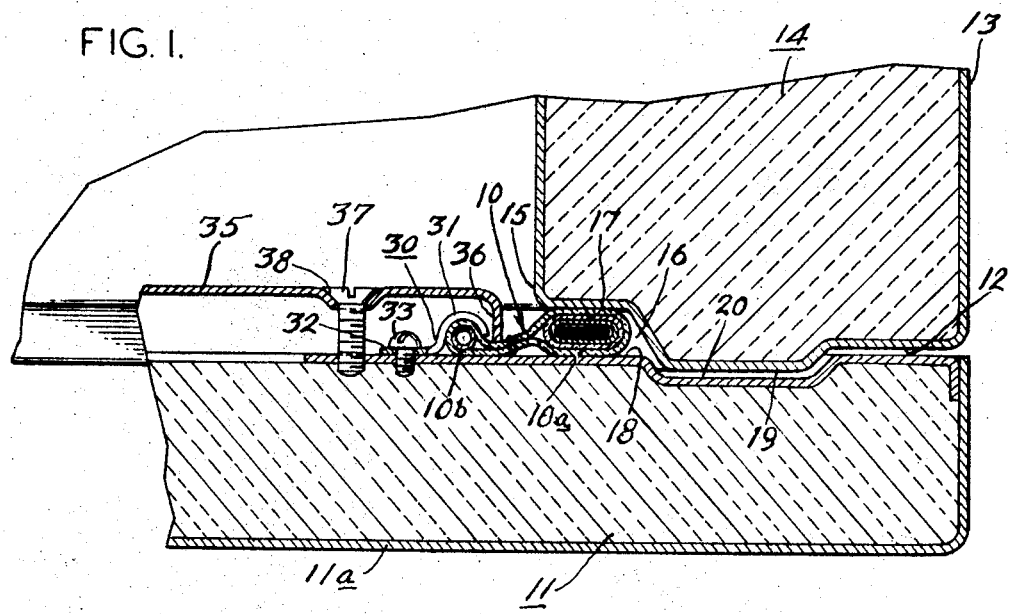
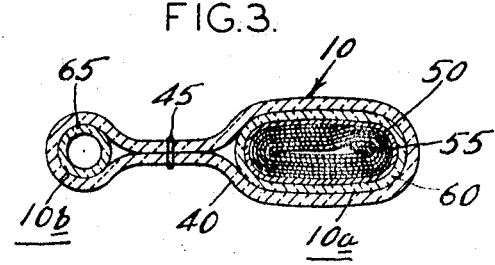
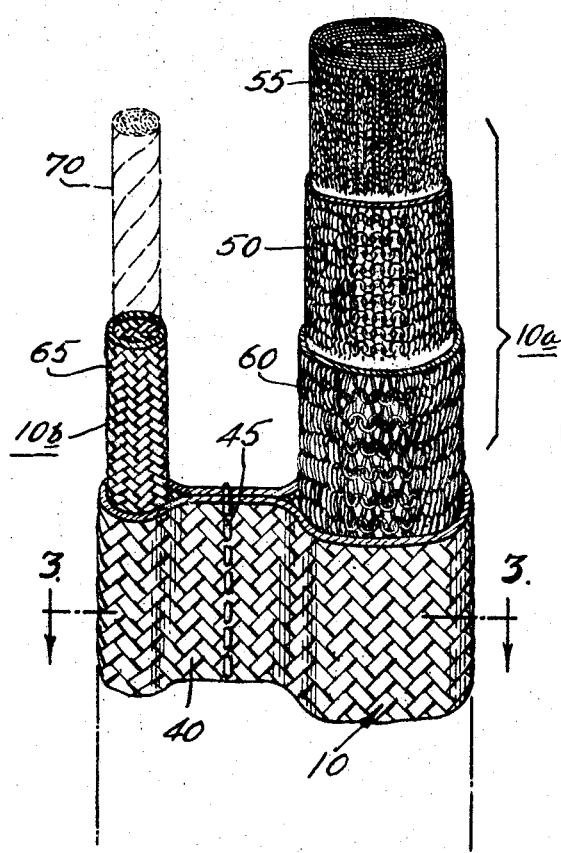
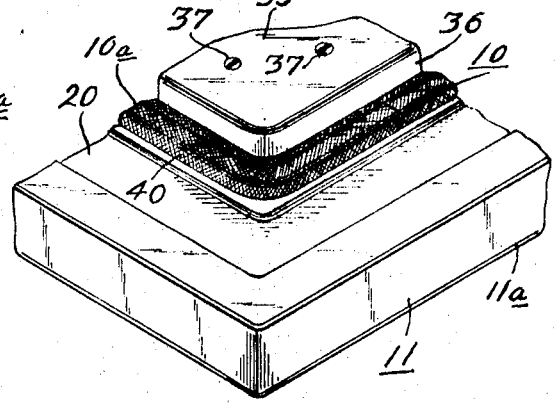
INVENTORS:
ROBERT L. NUNNALLY
THOMAS L. WEIL
BY Howson & Howson
ATTYS.

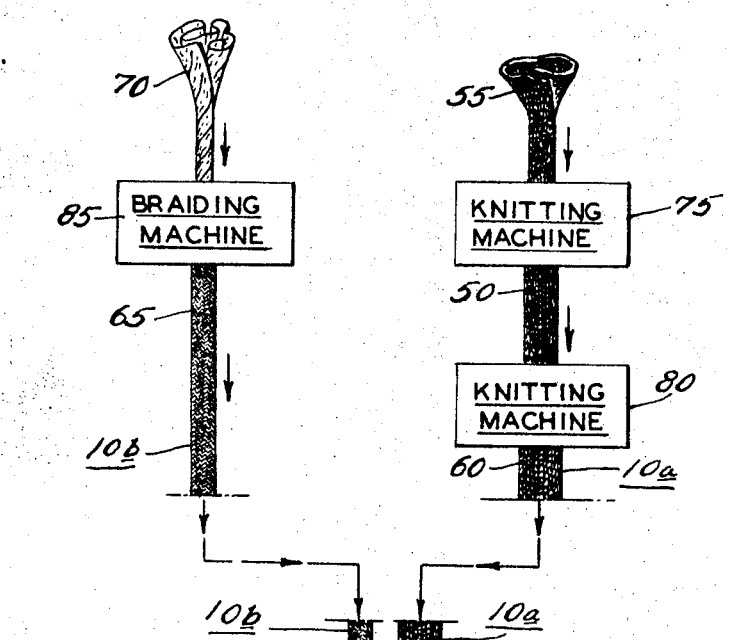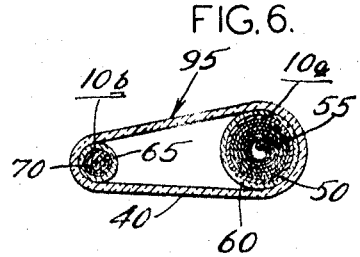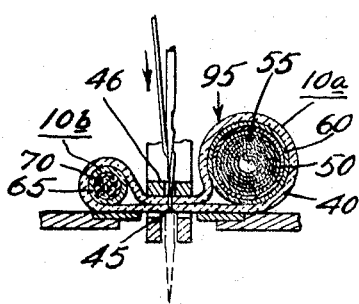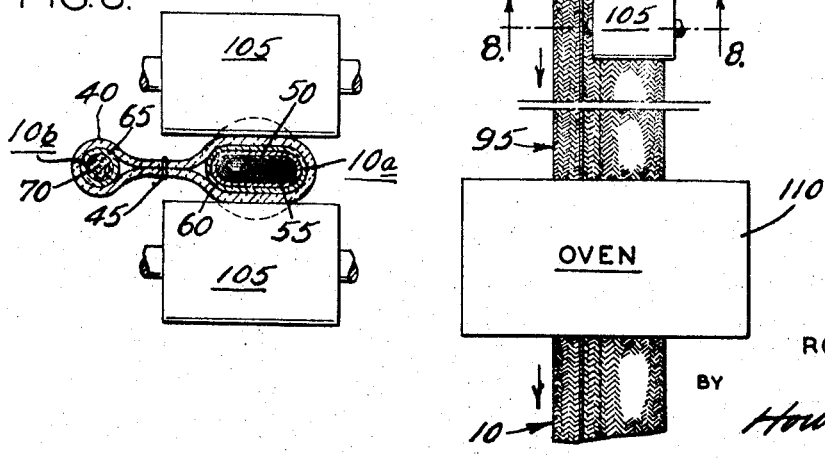

OVEN DOOR SEAL AND METHOD OF MAKING SAME

The present invention relates to thermal gaskets, and more particularly, the present invention relates to a gasket for use in sealing the door of an oven of the self-cleaning type and to a method of making the gasket.

The advent of self-cleaning ovens has created a demand for a gasket for sealing the oven door to prevent the escape of odors and heat from the interior of the oven when in its cleaning cycle. Since the temperatures employed in effecting cleaning of the oven are in excess of 900° F., the gaskets must be resistant to thermal degradation at these temperatures. In addition to being heat resistant, the gaskets must also possess sufficient resilience to maintain a fluidtight seal between adjacent surfaces which may move relative to each other in response to thermal expansion and contraction.

A thermal gasket for self-cleaning ovens must also have properties which enable it to function when the oven is in normal use and is not in its cleaning cycle. For example, it is desirable for the gasket to be abrasion resistant. Furthermore, it is desirable for the gasket to possess shock and sound absorption qualities so that the oven door to which it is secured may be closed with a minimum of noise. In addition, the gasket must be durable and economical to manufacture.

In view of the foregoing, it is a primary object of the present invention to provide a novel gasket for a door on a self-cleaning oven to prevent the escape of fumes from the oven when in its cleaning cycle.

It is another object of the present invention to provide an improved oven door gasket which is resistant to shock and abrasion.

It is a further object of the present invention to provide an oven door gasket which is economical to fabricate.

As a further object, the present invention provides a gasket for an oven door which reduces the noise normally generated when the door is closed.

As still further object, the present invention provides a novel method for making a thermal gasket for use in sealing the door of a self-cleaning oven.

More specifically, the present invention provides a unique thermal gasket for use on oven doors and a novel method for fabricating the gasket. The gasket comprises a sealing element having tubular metal mesh core means sheathed by a tubular knit fiberglass fabric and a braided fiberglass tubular mounting element disposed parallel therewith, both elements being surrounded by a braided fiberglass jacket having a longitudinal stitch between the elements which disposes the elements in spaced parallel relation therewithin. The gasket is mounted on an oven door by means of a series of clamps which engage around the tubular mounting element, the clamps and mounting element being protected from radiant oven heat by a cover plate extending across the inside of the door. The gasket is fabricated by a method in which a fiberglass sheath is knitted around the metal mesh core means and a fiberglass sheath is braided around a paper core before the cores are disposed in close parallel relation as they advance longitudinally between the elements as they advance to space the elements therein. The sealing element is compressed into an oval shape after the gasket is joined, for example, by stitching, and the paper core is disintegrated and removed when heat is applied thereto to effect combustion thereof as the gasket assembly advances through an oven.

These and other objects, features and advantages of the present invention should become apparent from the following description when taken in conjunction with the accompanying drawings in which:

FIG. 1 is a fragmentary sectional view of an oven having a door with a gasket embodying the present invention;

FIG. 2 is an enlarged fragmentary view of the gasket of FIG. 1 telescoped to illustrate details of its construction, its removable paper core being shown in broken lines;

FIG. 3 is a view in transverse cross section of the gasket of FIG. 2;

FIG. 4 is a fragmentary perspective view of the gasket of FIG. 1 mounted on an oven door;

FIG. 5 is a schematic diagram of the steps employed in making the gasket illustrated in FIG. 1;

FIG. 6 is a sectional view taken along line 7–6 of FIG. 5 and illustrating a braided jacket having a tubular sealing element spaced from a tubular mounting element therein before the jacket is stitched longitudinally therebetween;

FIG. 7 is a sectional view taken along line 7–7 of FIG. 5 and illustrating the braided jacket being stitched; and FIG. 8 is a sectional view taken along line 8–8 of FIG. 5 and illustrating the gasket being compressed between a pair of rollers before it advances into an oven for removing the paper core.

As noted heretofore, high temperatures are developed in a self-cleaning oven when it is operated in its cleaning cycle. For example, temperatures in excess of 900° F. are not uncommon. At these temperatures substantially all of the matter on the oven walls is oxidized; however, before complete oxidation occurs, the matter may tend to liberate undesirable odors. Therefore, in order to prevent the escape of odors from the oven, it is imperative that the oven door be properly sealed.

Ordinary sealing agents such as rubber, asbestos, or the like are not suitable for use in self-cleaning ovens. The high temperatures cause rapid deterioration of rubber gaskets and asbestos gaskets do not have long-wearing qualities. Furthermore, asbestos gaskets do not possess sufficient resiliency to maintain a fluidtight seal in response to relative movement between the door and the oven as the oven expands and contracts in heating to and cooling from its cleaning cycle temperature. These disadvantages are obviated by the present invention which provides a heat-resistant gasket for use in sealing oven doors, the gasket being resilient and durable and having good wearing qualities.

Referring now to the drawings, there is illustrated in FIG. 1 a gasket 10 in accordance with the present invention. As may be seen therein, the gasket 10 is mounted on an insulated oven door 11 having a metal skin 11a, and closing against a metal front edge or a jamb 12 on an insulated sidewall 13 of a self-cleaning-type oven 14. The gasket 10 is disposed alongside an access opening 15 in the front of the oven 14 in a cavity 16 between a flat surface 17 on the jamb 12 and a flat surface 18 on the inside of the door 11. In the present instance, a stop is provided for the door 11 by a protrusion 19 on the jamb 12 which cooperates with a depression 20 on the inside of the door 11 to limit the inward displacement of the door 11 so that the surfaces 17 and 18 are spaced a slight distance away from each other. In this manner, a sealing space is provided between the periphery of the door and the jamb.

An oven door gasket must be securely mounted on the oven door to prevent it from becoming disassociated therefrom when the door is opened and closed in normal use. To this end, the gasket 10 has a sealing element 10a (FIG. 1) disposed in the sealing space or cavity 16 and has a mounting element or rib 10b spaced therefrom and engaged at spaced intervals along its length by a series of clamps, for example, the clamp 30. As may be seen in FIG. 1, the clamp 30 has a semicylindrical portion 31 engaging the rib 10b and has a tab portion 32 which is fastened to the oven door 11 by means of a metal screw 33. With this mounting arrangement, the gasket 10 may be readily installed on the door when the oven unit is manufactured and may be readily removed therefrom should subsequent replacement become necessary.

Because high temperatures are developed in a self-cleaning oven, the door gasket must be protected from the heat as much as possible to prolong its operational life. To this end, a cover plate 35 extends across the inside of the oven door 11 and terminates on its periphery in a downturned lip 36 which engages the gasket 10 between the mounting and sealing elements. As may be seen in FIGS. 1 and 4, the cover plate 35 is secured to the door by means of a series of screws, for example, a flathead screw 37 in a conically shaped recess 38 in the cover plate 35 so that the head of the screw is disposed flush with the inside surface of the oven door. In this manner, rotation of the screw in the proper direction displaces the cover plate 35 toward the door 11 to cause its lip 36 to engage the gasket 10. Thus, the mounting element 10b of the gasket 10 is protected somewhat from the oven heat while securely fastening the gasket to the oven door.

In accordance with the primary object of the present invention, the gasket 10 has a novel structure which possesses good thermal and abrasion resistance qualities, which maintains its resiliency at elevated temperatures, and which is economical to manufacture. For these purposes, the sealing element 10a and the mounting element 10b are surrounded by a fabric jacket or cover means 40 to of flexible heat-resistant material, preferably fiberglass. As may be seen in FIG. 2, the jacket 40 and the mounting element 10b have a braided tubular structure which may be compressed and extended longitudinally to permit the gasket to be flexed in a plane through the elements so that the gasket may be disposed around sharp corners without pleating, as shown in FIG. 4 for example. In the present instance, the cover is braided with fiberglass yarn-type ECG 150 3/2 4.0 Z with two ends in a braiding machine having 18 picks/inch. With this construction, the gasket may be fitted for oven doors having a variety of peripheral shapes and sizes since the braided construction facilitates the shaping of the gasket around corners thereby reducing the necessity of manufacturing the gasket with accurate tolerances.

For the purpose of maintaining the mounting and sealing elements in space parallel relation so that the sealing element is properly disposed in the space 16 around the door 11, means is provided to join the braided jacket along a line between the elements so as to space the elements within the jacket 40. In the present instance, the spacing is effected by stitching 45, preferably of fiberglass thread, extending lengthwise of the jacket intermediate the elements 10a and 10b. Thus, as may be seen in FIG. 2, the stitching 45 operates not only to space the elements but also to cause the cover to fit closely therearound to securely contain the elements therein. If desired, two or more parallel lines of stitches may also be used effectively; however, at a slight reduction in gasket flexibility.

In addition to being heat resistant, an oven door seal must also be resilient to provide an effective seal and to absorb some of the noise generated when the door is closed. For this purpose, the sealing element 10a has tubular knit wire core means 50, preferably of stainless steel wire and knitted to a preferred specification of 5 wales and courses/inch in a 24-needle tubular-type knitting machine with the wire having a diameter of 0.006 inch. By virtue of this knitted structure, a flexible wire core is provided which is resilient along its entire length and which is resistant to the stresses and other effects of high temperature operation.

The sealing element 10a is shaped along its length so that it engages along a substantial portion of each surface 17 and 18 to provide an effective fluidtight seal therebetween. For this purpose, the sealing element has an oval cross section along its length. In order to support the walls of the core means 50 in this configuration, wire mesh 55 is disposed on the inside thereof. As may be seen in FIGS. 2 and 3, the wire mesh 55 is a tubular knit wire fabric which is folded longitudinally on itself to dispose its sides in contact with each other in a spiral fashion (FIG. 3). The wire mesh is preferably knitted to a specification of 6 wales/inch and 4 courses/inch on a needle tubular knitting machine with 30455-type wire 0.006 inch in diameter. The resultant mesh, when folded, provides the means for resiliently supporting the walls of the core along its length so that a resilient and heat-resistant seal may be effected.

Relative movement between the surfaces 17 and 19 due to thermal expansion and contraction and impact forces on the gasket when the door is closed may cause the wire mesh core means 50 to abrade the jacket. In order to obviate this situation, means is provided intermediate the core and the jacket to permit the core to slide freely relative to the jacket. For this purpose, a tubular knit sheath 60 surrounds the core 50 along its length. In the present instance, the sheath is of fiberglass fabric construction having a preferred knitting specification of 12 wales and courses/inch and being knitted on a 20-needle tubular knitting machine. In addition, the preferred yarn-type is ECG 150 1/3 4.0 Z. Thus, with this construction, the core 50 may slide longitudinally with a minimum of friction within the jacket 40 without causing undue wear in the jacket.

As noted heretofore, the mounting element or rib 10b is protected somewhat from high radiant heat temperatures on the inside of the oven 14 by the cover plate 35 extending across the inside of the door. Although protected from some of the effects of radiant heat, the mounting element is subjected to high temperatures; therefore, it must be of heat-resistant construction. For this purpose, the mounting element 10b has a hollow tubular structure smaller in cross section than the sealing element 10a and preferably of braided fiberglass construction. In the present instance, the mounting element 10b is braided with fiberglass yarn-type ECG 50 4/4 4.0 Z on a machine having 18 picks/inch around a paper core 70 shown in broken lines in FIG. 2. The paper core is necessary for braiding the mounting element; however, it reduces the flexiblity of the mounting element. As will be more fully described hereinafter, the paper core is removed from the mounting element by a novel method so that the flexibility of the mounting element in the finished gasket is not impaired.

As noted heretofore, the gasket of the present invention is fabricated by a novel method by which manufacturing economies may be effected. These economies are realized by fabricating continuous lengths of the gasket in an automated process requiring a minimum of supervision.

Referring now to FIGS. 5—8 (Sheet 2), there is illustrated schematically a manufacturing process according to the present invention. As may be seen in FIG. 5, the wire mesh 55 comprising part of the resilient core of the sealing element 10a is folded longitudinally on itself in a spiral fashion as it advances forwardly or downwardly before entering the center of a tubular knitting machine 75 which knits the wire core means 50 therearound as it advances. The sealing element 10a is completed after its fiberglass sheath is knitted around the wire core means 50 by another tubular knitting machine 80 as the core means 50 advances centrally therethrough.

The mounting element 10b is fabricated simultaneously with the fabrication of the sealing element 10a. Thus, as may be seen at the upper left-hand corner of FIG. 5, the removable paper core 70 is folded longitudinally on itself and is twisted into a cylindrical shape before it advances longitudinally into a braiding machine 85 which operates to braid the fiberglass sheath 65 tightly therearound. The paper core 70 facilitates braiding in the present invention by providing a solid center for the sheath in the braiding machine 85.

In the present invention, the knitting and braiding machines 75, 80 and 85 are synchronized so that the mounting and sealing elements are produced at about the same linear velocity. In addition, the sealing-element knitting machines 75 and 80 are disposed in a fabrication line in a manner which permits the elements to be funneled together into closely spaced adjacent relation as they advance. In this manner, the elements advance together in spaced parallel relation through subsequent fabrication machinery.

The jacket 40 is braided around the elements 10a and 10b as they advance. For this purpose, a braiding machine 90 is provided to receive the elements centrally therewithin for braiding the jacket 40 therearound. At this stage of the process, the elements 10a and 10b are spaced apart in the jacket 40 as illustrated in FIG. 6.

In order to maintain the elements in spaced relation in the jacket 40, the longitudinal line of stitching 45 is provided therein between the elements. For this purpose, the jacketed assembly 95 advances longitudinally through a sewing machine 100 which applies the stitch 45 thereto. As may be seen in FIG. 7, a foot 46 on the sewing machine engages the jacket 40 between the elements 10a and 10b to maintain them in properly spaced relation in the jacket while it is being stitched. In this manner, the spacing of the elements is automatically maintained.

The sealing element 10b is shaped after it is stitched. For this purpose, the gasket assembly is compressed between a pair of rollers 105, 105 which engage opposite outer sides of the jacket 40 as the gasket assembly advances therebetween. As may be seen in FIG. 8, the rollers overlie only sealing element 10a and are spaced apart vertically a slight distance which causes the sealing element 10a to assume a substantially oval shape as the gasket assembly advances therebetween. If desired, the rollers may be mounted for vertical displacement so that the shape imparted to the sealing element may be varied to suit various sealing space requirements.

As may be seen in FIG. 8, the paper core 70 is still present on the sheath 65 when the gasket assembly is being shaped, and in accordance with the present invention, the paper core is removed from the gasket assembly in a novel manner. To this end, the jacketed assembly 95 is heated to a temperature in a range of substantially 800° F. to 1,100° F. in an oven 110 as it advances therethrough. At this temperature, combustion of the paper core 70 takes place and it is thereby disintegrated and removed from inside its sheath. The paper must be combusted at a temperature below the degradation temperature of the fiberglass and the wire mesh, and is of a composition which burns without substantial residue, so that it is completely removed from within the sheath 65 in this step. In addition to removing the paper core, heating the gasket assembly for a period of time in this temperature range tends to cause oil, yarn binders and adhesive, and like foreign matter, to be removed from the gasket assembly. As one skilled in the art should readily perceive, the residence time in the oven varies with the temperature, the mass of the gasket assembly, the type of paper core and like considerations. Accordingly, the oven temperature may be varied in this range to suit these operating conditions. In addition to removing the paper core and undesirable foreign matter from the gasket, the jacketed assembly 95 tends to develop a set when heated. Thus, when it is removed from the oven and is cooled, the sealing element 10a and mounting element 10b tend to maintain the configuration they had upon entering the oven.

After the jacketed assembly 10 is removed from the oven and cooled, it may be wound into reels or otherwise packaged for subsequent mounting oven doors. If desired, the gasket 10 may be cut into predetermined lengths and sewn together at its free ends to form a continuous closed gasket. The gasket may then be secured to the oven door 11 by clamps 30 before the cover plate 35 is mounted thereon. It should be noted however, that it is not necessary to sew the ends of the gasket together, since the clamps 30 on the oven door will maintain it in its proper configuration.

In view of the foregoing, it should be apparent that a novel gasket has now been provided for sealing a door on a self-cleaning type of oven, and a unique method has also been provided for fabricating the gasket in an economical manner.

While a preferred embodiment of the present invention has been described in detail, various modifications, alterations and changes may be made without departing from the spirit and scope of the present invention.

We claim:

1. A heat-resistant gasket for use in sealing a space between closely adjacent relatively movable surfaces, comprising: a sealing element having a tubular length of knitted fiberglass fabric and means forming a resilient metal wire core extending on the interior of said fabric along its length to support said fabric in a substantially tubular configuration when disposed between said surfaces; a hollow tubular mounting element smaller in transverse cross section than said sealing element extending along the length of said knitted fabric a spaced distance therefrom for mounting said sealing element on a selected one of said surfaces; braided fiberglass cover means surrounding said sealing and mounting elements; and means to space said elements in said cover means, whereby a flexible, heat-resistant gasket is provided.

2. A gasket according to claim 1 wherein said resilient core means includes a length of tubular knitted wire.

3. A gasket according to claim 2 including a length of longitudinally folded wire mesh disposed within the interior of said tubular knitted wire.

4. A heat-resistant gasket for use in sealing a space between closely adjacent relatively movable surfaces, comprising: a sealing element having a length of tubular knitted fabric and means forming a resilient core extending on the interior of said fabric along its length to support said fabric in a substantially tubular configuration when disposed between said surfaces; a fiberglass mounting element extending along the length of said knitted fabric a spaced distance therefrom for mounting said sealing element on a selected one of said surfaces; braided fiberglass cover means surrounding said sealing and mounting elements; and means including at least one line of fiberglass stitching extending through said cover between said elements to space said elements in said cover means, whereby a flexible, heat-resistant gasket is provided.

5. A method for making a flexible heat-resistant gasket comprising the steps of:
knitting a fiberglass sheath around a longitudinally advancing tubular wire mesh core,
braiding a fiberglass sheath around a longitudinally advancing paper core,
disposing said sheathed cores in spaced parallel relation sa as they advance,
braiding a common fiberglass cover around said advancing sheathed coves,
joining said cover along a line extending longitudinally between said sheathed cores,
applying heat to said joined assembly at a temperature sufficient to cause combustion and disintegration of said paper core, and
removing said heat from said assembly, whereby a length of a flexible, heat-resistant gasket is produced.

6. A method according to claim 5 including the step of maintaining said temperature in said heat applying step in a range of substantially 800° F. to 1,100° F.

7. A method according to claim 5 including the step of knitting said wire core before knitting said fiberglass sheath therearound.

8. A method according to claim 7 including the step of longitudinally folding a wire mesh and knitting said wire core therearound.

9. A method according to claim 5 including the step of longitudinally folding said paper core before braiding said fiberglass sheath therearound.

UNITED STATES PATENT OFFICE
CERTIFICATE OF CORRECTION

Patent No. 3,578,764                Dated May 18, 1971

Inventor(s) Robert L. Nunnally and Thomas L. Weil

It is certified that error appears in the above-identified patent and that said Letters Patent are hereby corrected as shown below:

Column 1, line 55, after "longitudinally" insert--- period (.) A fiberglass jacket is then braided around the parallel advancing cores, and the braided jacket is joined along a line extending longitudinally---

Column 2, line 3, change "7" to---6---

Column 3, line 11, delete "to"

line 66, change "19" to---18---

Column 5, line 13, after "the" insert---inside of the---

Column 6, line 40, change "coves" to---cores---

Signed and sealed this 7th day of September 1971.

(SEAL)
Attest:

EDWARD M. FLETCHER, JR.           ROBERT GOTTSCHALK
Attesting Officer                     Acting Commissioner of Patents

FORM PO-1050 (10-69)